Figure 1:
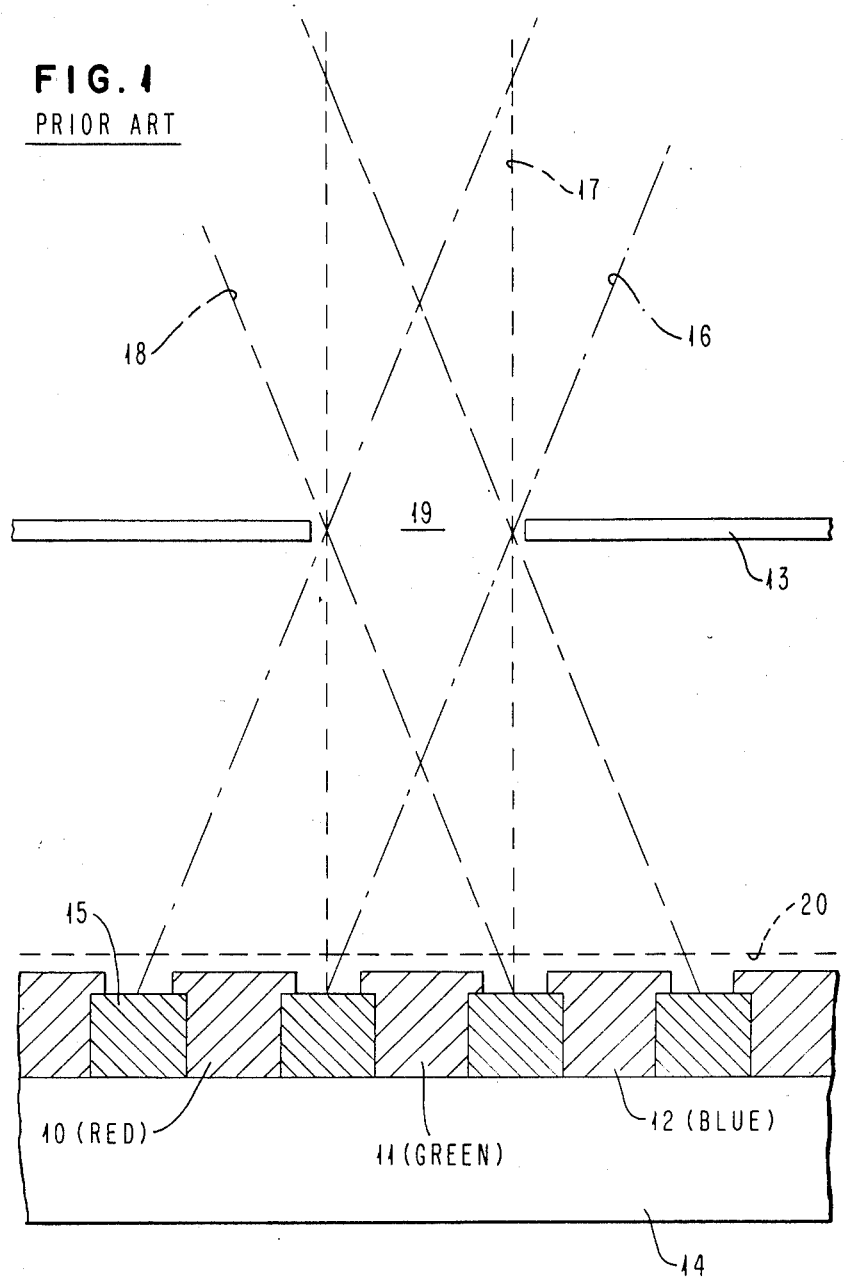

United States Patent [19]

Barrett et al.

[11] Patent Number: 4,565,946
[45] Date of Patent: Jan. 21, 1986

[54] COLOR CATHODE RAY TUBE WITH INFRARED EMITTING PHOSPHOR IN SCREEN

[75] Inventors: William H. Barrett; Andre B. Minn, both of Woodstock, N.Y.

[73] Assignee: International Business Machines Corporation, Armonk, N.Y.

[21] Appl. No.: 495,882

[22] Filed: May 18, 1983

[51] Int. Cl.⁴ .................. H01J 29/07; H01J 29/20; H01J 29/32
[52] U.S. Cl. .................................. 313/408; 313/467; 313/472; 313/474
[58] Field of Search ............... 313/471, 466, 472, 408, 313/474, 467

[56] References Cited

U.S. PATENT DOCUMENTS

| | | | |
|---|---|---|---|
| 2,945,087 | 7/1960 | Graham et al. | 313/471 X |
| 3,018,405 | 1/1962 | Oxenham | 313/471 X |
| 3,384,712 | 5/1968 | Gruen | 313/474 X |
| 3,691,424 | 9/1972 | Goodman | 313/471 X |
| 4,100,452 | 7/1978 | Kaplan | 313/408 |
| 4,135,113 | 1/1979 | Tsuneta et al. | 313/474 X |

Primary Examiner—Palmer C. DeMeo
Attorney, Agent, or Firm—Joseph J. Connerton

[57] ABSTRACT

In order to permit reliable light pen interaction with a black matrix shadow mask CRT, the conventional black carbon matrix is replaced by an IR phosphor. This provides a component of IR radiation irrespective of the particular color of the visible display at any given point, and such component can be detected by conventional silicon photodetector light pens. Preferably the particle size of the IR phosphor is substantially less than that of the primary color phosphors so as to largely retain both the packing density of the original black matrix and the edge definition at the IR phosphor/primary color phosphor boundaries. The IR phosphor particles are also pigmented with black graphite to retain the light-absorbing qualities of the original black matrix.

6 Claims, 3 Drawing Figures

COLOR CATHODE RAY TUBE WITH INFRARED EMITTING PHOSPHOR IN SCREEN

This invention concerns a shadow mask cathode ray tube (CRT), in particular but not exclusively for use in an interactive computer graphics system.

As is well known, a shadow mask CRT is a color reproducing cathode-ray tube of the kind comprising, within an evacuated envelope, an image screen provided with a plurality of groups of elemental phosphor areas, each group of phosphor areas having a different color radiation characteristic and the groups being interspersed so as to form repetitive clusters of areas including one area from each group, electron gun means for projecting a corresponding plurality of electron beams toward the image screen, deflection means for causing the electron beams to scan the image screen in synchronism, and a mask (the shadow mask) disposed adjacent the screen between the latter and the electron gun means and having a plurality of apertures so arranged as to constrain each beam to strike the elemental phosphor areas of only one respective group.

Shadow mask CRTs have long been used in the field of domestic color television, and their construction and operation is very well known to those skilled in the art. One example of a typical shadow mask CRT is described in U.S. Pat. No. 3,146,368 whose contents are hereby incorporated by reference.

Although U.S. Pat. No. 3,146,368 describes a construction of shadow mask CRT in which the elemental phosphor areas are in the form of circular dots clustered in triads of red, green and blue light-emitting phosphors, these areas may take other shapes with a corresponding shape of the apertures in the shadow mask. Thus, the elemental phosphor areas may be in the form of clusters of rectangles, hexagons or other geometric shapes. Furthermore, a recent and now well-established form of shadow mask tube uses narrow vertical phosphor stripes each of which extends the full height of the image screen. In this case, each cluster of elemental phosphor areas constitutes a set of adjacent vertical phosphor stripes of different color radiation characteristics and the corresponding shadow mask (alternatively referred to as an aperture grill in this type of tube) comprises a large number of vertical slits also extending the full height of the screen. A shadow mask CRT of this latter type is referred to in U.S. Pat. No. 3,666,462, particularly with reference to FIG. 5. In either case the image screen may comprise the inside surface of the CRT faceplate itself, or a separate transparent support behind the faceplate.

In the aforementioned U.S. Pat. No. 3,146,368 each of the elemental phosphor areas is spaced on the image screen from all adjacent such areas and the apertures in the shadow mask are individually larger than the elemental phosphor areas so that each beam striking any given elemental phosphor area additionally falls on a portion of the screen which spaces that area from adjacent areas. In particular, a negative tolerance guard band arrangement is described in which circular phosphor dots are used and the electron beam not only falls upon the dot in any given case but also upon an annular portion of the screen immediately surrounding the dot, a black light-absorbing material known as a black matrix being provided over substantially the entire area of the screen not occupied by the phosphor dots.

The advantage of this arrangement is that the black matrix intermediate the dots absorbs ambient light and increases the contrast of the image. The negative tolerance guard band black matrix technique has also been applied to the aperture grill type of shadow mask CRT, see for example U.S. Pat. No. 4,267,204, with the vertical slits in the grill being wider than the phosphor stripes and the latter being separated from the adjacent stripes by intermediate stripes of light-absorbing material. In this case the electron beam passing through any given aperture falls substantially centrally on the relevant phosphor stripe with the opposite lateral edges of the beam falling on the light-absorbing material on either side. In modern shadow mask CRTs the light-absorbing material or black matrix comprises graphite of sub-micron particle size.

The long-established development of shadow mask tubes such as those described in U.S. Pat. Nos. 3,146,368 and 3,666,462 for domestic television, with their consequent high reliability and relatively low cost, has led to their use as video display units in multi-color computer graphics applications. Essentially, the shadow mask tubes used in computer graphics are the same as those used in domestic television, except that for high resolution graphics, both the number of individual elemental phosphor areas on the image screen and the precision of the deflection circuitry is increased as compared to the domestic tube. Nevertheless, whether the tube is for high resolution graphics or low resolution graphics (in which case a domestic-grade tube can be used), the fundamental principles of construction and operation are well known.

A common requirement in interactive computer graphics is the ability to provide user feedback by the use of a so-called light pen which contains a photosensitive device responsive to light emitted by the CRT display for providing a feedback signal to the display control unit. It is important in such applications that the light pen reliably "triggers" in response to any light emissive portion of the displayed image at which the pen is pointed at any given time. This is not a great problem in monochrome displays, since the image is a single color and by a suitable choice of phosphor and light pen characteristics, the response of the light pen can be matched to the spectral frequency and transient response of the phosphor.

However, in color displays, different parts of the image will usually be of different colors, but this has the disadvantage that conventional light pens are not sufficiently sensitive to a wide range of colors in the visible spectrum. Thus conventional light pens tend to have their peak response at the longer wavelengths, with the result that triggering on blue cannot be achieved reliably without taking further measures.

One way to improve the reliability of triggering on blue with conventional light pens is to use the "window shade" effect, which involves temporarily brightening up the image from the top down (in a conventional horizontal raster scan display) when a light pen detect is required, the brightening being terminated just below the position of the light pen after the latter is triggered. However, this provides a disturbing flash to the user which is undesirable from a human factors aspect, and also entails additional control circuitry.

German Published Patent Application No. 30 37 719, although mainly concerned with beam index-type CRTs not relevant to the present invention, refers briefly to a shadow mask CRT in which each cluster of elemental primary color phosphor areas additionally includes an infra-red or ultra-violet emitting phosphor area, and in which an additional electron beam is produced for exciting these IR or UV areas. The presence of these additional IR or UV areas in each cluster is not primarily intended to provide satisfactory light pen triggering on all colors, but rather to permit light pen detection at any point on the screen whether part of the visible image or not. Thus this technique cannot be used to distinguish between points on the screen containing part of the visible image and points on the screen which do not, which is an important requirement in interactive computer graphics. Furthermore, the additional IR or UV phosphor dots occupy space on the image screen which reduces both the maximum resolution and brightness of the tube by about 25%, since the primary color phosphors are less densely spaced, and the requirement for a further electron beam increases the cost of the tube and the complexity of the control circuitry.

It is therefore an object of the invention to provide a shadow mask CRT for use with a light pen which improves the detection reliability of the light pen while avoiding or reducing the disadvantages associated with the above techniques.

This object is achieved in a shadow mask CRT in which each of the elemental phosphor areas is spaced on the screen from all adjacent such areas, and in which the apertures in the shadow mask are individually larger than the elemental phosphor areas, by providing the image screen with a material emissive of invisible radiation when struck by an electron beam, such material being located adjacent each elemental phosphor area on at least part of the portion of the screen which spaces that area from the adjacent areas and which is struck by the same electron beam.

Thus the invention places material emissive of invisible radiation in the spaces between the visible color phosphor areas, and by virtue of the enlarged shadow mask apertures, a portion of such material is excited whenever a phosphor area is struck by an electron beam. Thus, irrespective of the color of the image at any point, a component of this invisible radiation will always be present. It is therefore only necessary for the light pen to be responsive to the spectral frequency and transient response of the invisible radiation component to provide reliable triggering on any color. Where, as in the preferred embodiment, the invisible radiation is infra-red, a conventional light pen sensitive to IR may be used, so that a special construction of light pen is not necessary in that case.

The invention avoids the disturbing flash associated with the "window shade" effect and, due to the location of the invisible radiation emissive material in the spaces between the visible color phosphor areas, also avoids a reduction in the density of the visible color phosphor areas on the screen. The invention may also be implemented at low cost since it does not involve any additional electron beams or control circuitry.

In the preferred embodiment of the invention to be described, the invention is implemented simply by replacing the standard black matrix of a negative tolerance guard band shadow mask CRT with a material comprising an IR phosphor; in other words, the material is located over substantially the entire area of the image screen not occupied by the primary color phosphor areas. To preserve as far as possible the light-absorbing qualities previously provided by the black carbon matrix, the IR phosphor particles are pigmented with sub-micron graphite particles. Furthermore, the IR phosphor particles are selected to have a mean size of about 1 to 2 $\mu$m (micron) as compared to a conventional IR phosphor size of 6 to 10 $\mu$m. This small size provides a relatively sharp boundary between the IR phosphor and the primary color phosphors, whereby the luminance efficiency of the latter is not degraded at the edges, and provides dense packing in the matrix areas. The overall contrast of the CRT is further enhanced by reducing the reflectivity of the faceplate by controlling the stipple depth and density thereof. The particular IR phosphor used is of known kind and comprises cadmium sulphide with copper activator (CdS:Cu). The intensity of this IR phosphor peaks at about 780 nm and 1020 nm which satisfactorily matches the response of most silicon photodetector light pens. Furthermore, its short rise time (less than 1 $\mu$s) gives a peak to average intensity ratio of about 41,700 at 60 Hz.

Figure 2:
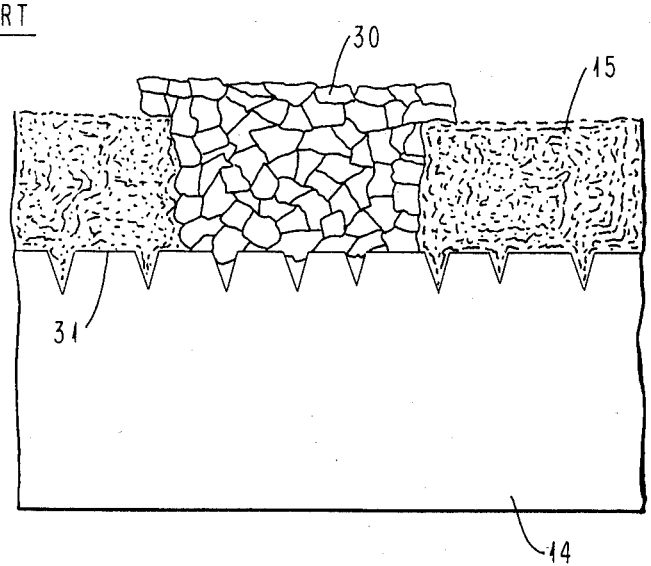
Figure 3:
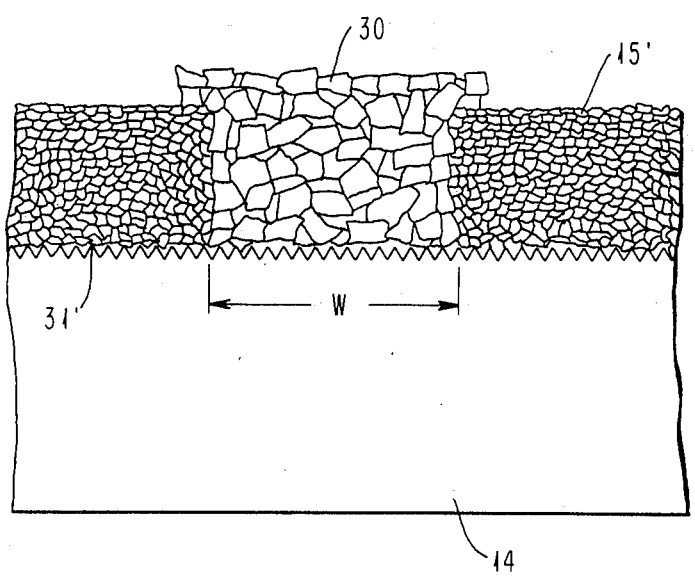

An embodiment of the invention will now be described, by way of example, with reference to the accompanying drawings, in which:

FIG. 1 is a schematic horizontal cross-section through a portion of a prior art shadow mask CRT, FIG. 2 is an enlarged view of one of the elemental phosphor areas of FIG. 1 together with part of the adjacent black matrix, and FIG. 3 is an enlarged view similar to FIG. 2 of one of the elemental phosphor areas of the embodiment of the invention together with part of the adjacent IR phosphor.

In the following description of the preferred embodiment of the invention it will be assumed that the reader is familiar with the basic construction and operation of the various types of shadow mask CRT, as described for example in the aforementioned U.S. Pat. Nos. 3,146,368, 3,666,462 and 4,267,204. The description will therefore concentrate on the differences between the standard tube and the present embodiment, i.e., the arrangement of the various phosphors on the image screen and their relationship to the shadow mask, since in other respects the CRT may be of perfectly conventional construction.

FIG. 1 is a schematic horizontal cross-section through a portion of the image screen of a prior art black matrix type shadow mask CRT, and illustrates a single cluster of red, green and blue primary color elemental phosphor areas 10, 11 and 12 respectively together with the associated shadow mask 13. The phosphor areas 10 to 12 are deposited on the inside surface of the CRT faceplate 14 and each is spaced from its neighbors by a black matrix 15. The corresponding red, green and blue electron beams are shown at 16, 17 and 18 respectively, and each beam enters the particular shadow mask aperture 19 associated with the cluster of areas 10 to 12 at such an angle that the red electron beam 16 only strikes the red phosphor area 10, the green beam 17 only strikes the green phosphor area 11 and the blue beam 18 only strikes the blue phosphor area 12. In each case, however, since the aperture 19 is larger than the phosphor areas 10 to 12, the respective beam also falls upon a portion of the black matrix 15 which spaces each of the phosphor areas 10 to 12 from its neighbors. It is to be understood that each beam 16 to 18 normally does not fall solely upon a single phosphor area of the respective color as might be inferred from the simplified figure, but that in general the diameter of each beam is much larger than the width of each aperture 19 and in fact enters several adjacent such apertures at one time.

However, after passing through the shadow mask 13, each beam will only strike elemental phosphor areas of its own color together with part of the adjacent black matrix 15. The phosphor areas 10 to 12 and the like clusters of such areas distributed over the inside surface of the faceplate 15 are covered in a conventional manner by a thin film 20 of aluminum transparent to the electron beams, the film 20 also covering the black matrix 15.

The horizontal cross-section shown in FIG. 1 corresponds to the arrangement for a CRT with in-line electron guns, i.e., the three electron guns are laterally spaced in a single horizontal plane, and the cross-section is the same whether the phosphor areas 10 to 12 are discrete dots such as in the conventional shadow mask CRT or vertical stripes as in the more recent aperture grill type of shadow mask CRT. Where a so-called delta arrangement of the electron guns is used, the three primary color phosphors constituting each cluster do not lie along a single horizontal line as shown, but are disposed in a corresponding delta formation. The present invention is of course applicable to all types of shadow mask CRT, but the in-line type is illustrated in order to illustrate the principles involved in a simple cross-sectional view.

It is to be understood that where the elemental phosphor areas 10 to 12 are discrete dots, each beam 16 to 18 will fall on its respective dot and also on an annular portion of the surrounding black matrix 15, whereas when the areas 10 to 12 are vertical stripes each beam will only fall on two segmental portions of the matrix 15 on horizontally opposite sides of the stripe.

FIG. 2 is an enlarged cross-sectional view of one of the elemental phosphor areas 10 to 12 of FIG. 1, together with part of the adjacent black matrix 15. The particles 30 of the primary color phosphor typically have a mean size of about 6 to 10 $\mu$m, whereas the black graphite particles of the matrix 15 are much finer and have a mean size of about 0.1 to 0.3 $\mu$m. Thus, since the matrix 15 is conventionally formed on the inside surface 31 of the faceplate 14 before the deposition of the primary color phosphors 30, the edge definition of the matrix is dominated by the graphite's fine particles so that the boundary between the black matrix 15 and the primary color phosphor 30 embedded therein is well-defined. The faceplate 14 is shown as having a conventional stipple inside surface 31 produced by a molding process used to produce the faceplate.

FIG. 3 is a cross-sectional view, similar to FIG. 2, of one of the elemental phosphor areas of an embodiment of the present invention, together with part of the adjacent light-absorbing matrix. Elements of FIG. 3 which are the same as corresponding elements in FIG. 2 are given the same reference numeral, whereas elements which differ in detail in this embodiment but correspond generally to similar elements in FIG. 2 are given the same reference numeral primed. Thus, it will be observed that the differences between the embodiment of FIG. 3 and the prior art of FIG. 2 lie in the composition of the matrix, referenced 15' in FIG. 3, and the nature of the inside surface of the faceplate, referenced 31' in FIG. 3. It is to be understood that the overall construction of the image screen and shadow mask of the CRT according to the embodiment corresponds to the cross-section shown in FIG. 1, subject to the modification of the matrix 15 and inside faceplate surface 31 to be described. It is therefore not thought necessary to repeat this figure for illustrating the present embodiment.

In FIG. 3, the particles 30 of the primary color phosphor have the same mean size as before, i.e. typically from about 6 to 10 $\mu$m. However, the sub-micron black graphite material of the matrix 15 is replaced by particles of IR phosphor 15' pigmented with sub-micron black graphite particles. The IR phosphor particles 15' have a mean size of about 1 to 2 $\mu$m compared to the conventional IR phosphor particle size of 6 to 10 $\mu$m so as to retain to a large degree the packing density in the matrix areas and the edge definition of the primary color phosphors. Finally, the inside surface 31' of the faceplate 14 is treated to provide a reduced stipple depth and an increased pit density compared to the conventional stipple surface 31. The mean stipple depth of the surface 31' may be from about 1.5 $\mu$m to 3 $\mu$m, with depth variations between individual pits confined to a narrow range, preferably between about 2.5 and 3 $\mu$m. The pit density may be from about $1 \times 10^5$ pits/cm$^2$ to about $15 \times 10^6$ pits/cm$^2$, with about $6 \times 10^6$ pits/cm$^2$ being preferred. Thus the surface 31' has a mean pit depth substantially less than that of the conventional stipple surface 31, the variations in pit depths also being confined to a relatively narrow range. Furthermore, the pit density is at least 10 times greater than that of the conventional stipple surface 31.

A technique for providing reduced stipple depth and an increased pit density in a color CRT faceplate is described in U.S. Pat. No. 3,813,568. However, this technique is optimized specifically for domestic (low resolution) tubes, and provides pit depths up to about 1.5 $\mu$m and a density of about $1 \times 10^7$ pits/cm$^2$. In the present embodiment the pit depths are increased somewhat and the pit density decreased, in order to optimize the stipple for a high resolution tube where the width W of the primary color phosphor areas 30 (as defined by the width of the openings in the matrix 15') is about 78 $\mu$m for an aperture grill type shadow mask CRT, and to promote close contact between the small IR phosphor particles 15' and the surface 31'.

A method of manufacturing the embodiment of the present invention, represented by FIG. 1 as modified by FIG. 3, will now be described.

The inside surface 31' of the faceplate 14 is prepared to the pit depth and density specified above by polishing to provide an initial smooth surface followed by chemical etching with hydrofluoric acid, the concentration, temperature and time of etching being mutually selected to provide the desired stipple characteristics. The control of etch characteristics in this way is well known in the art and no detailed description is thought necessary. Alternatively, the desired fine stipple on the inside surface 31' may be achieved through vapor blasting followed by a light etch.

The small-particle IR phosphor is synthesized from cadmium oxide with a mean particle size of 1 $\mu$m or less by firing with hydrogen sulphide, a trace of copper being added as activator in known manner. The resultant dark brown particles of CdS:Cu phosphor have a mean size of about 1 to 2 $\mu$m. They are then mixed with a colloidal form of aquadag (graphite) to further darken the body color of the IR phosphor particles. The final result is 1 to 2 $\mu$m particles of IR phosphor pigmented by a coating of submicron black graphite particles having a mean size substantially less than 0.5 $\mu$m, preferably 0.1 to 0.3 $\mu$m.

Having prepared the faceplate inside surface 31' and the IR phosphor 15' as above, the manufacture of the image screen is continued in generally standard fashion as follows.

First, a layer of clear PVA photoresist diluted with water is applied to the inside surface 31' of the faceplate 14. This is then selectively exposed to light through the shadow mask 13 simultaneously from all three color center positions, the mask apertures 19 at this stage being about 20% smaller than their final size. The exposed photoresist is next developed in water which results in a system of clear PVA dots or stripes, according to the type of shadow mask CRT, on the surface 31'. The size and positions of these dots or stripes corresponds to the size and positions of the primary color phosphors subsequently to be applied.

Next, a PVA slurry of the pigmented IR phosphor is applied to the surface 31', filling the spaces between the clear PVA dots or stripes, and hardened by a non-selective exposure to light. An aqueous solution of $H_2O_2$ is now used to disintegrate the clear PVA dots or stripes and to dislodge any overlying IR phosphor, while leaving undisturbed IR phosphor in direct contact with the glass faceplate 14. The final result at this stage is the pigmented IR phosphor matrix 15' with openings corresponding in size and position to the desired primary color phosphor dots or stripes.

Next the shadow mask 13 is post-etched to enlarge the apertures 19 to their final size, and the three primary color phosphors are successively applied in conventional fashion. Thus the red phosphor areas 10 are formed by applying a PVA slurry containing the red phosphor to the faceplate inside surface 31', exposing the latter through the shadow mask 13 from the red color center, and then developing to leave red phosphor dots or stripes 10 only in the desired openings of the matrix 15'. This is then repeated in turn for the green and blue phosphors, each being exposed through the shadow mask from its own color center. Finally, the aluminum film 20 is applied in standard fashion.

Having constructed the image screen as described above, the faceplate and shadow mask are finally assembled into the complete CRT. Since, as mentioned above, the present embodiment differs from the standard tube solely in the construction of the image screen, it is not thought necessary to give details of the overall CRT construction and assembly as this is well known to those skilled in the art.

While the invention has been particularly shown and described with reference to a preferred embodiment thereof, it will be understood by those skilled in the art that various changes in form and detail may be made therein without departing from the spirit and scope of the invention.

Having thus described our invention, what we claim as new and desire to secure by Letters Patent is:

1. A color producing cathode-ray tube comprising, within an evacuated envelope, an image screen provided with a plurality of groups of elemental phosphor areas, each group of phosphor areas having a different color radiation characteristic and the groups being interspersed so as to form repetitive clusters of areas including one area from each group, electron gun means for projecting a corresponding plurality of electron beams toward an image screen, deflection means for causing the electron beams to scan the image screen in synchronism, and a mask disposed adjacent the screen between the latter and the electron gun means and having a plurality of apertures so arranged as to constrain each beam to strike the elemental phosphor areas of only one respective group, each of the elemental phosphor areas being spaced on the screen from all adjacent such areas and the apertures in the shadow mask being individually larger than the elemental phosphor areas so that each beam striking any given elemental phosphor area of the respective group additionally falls on a portion of the screen which spaces that area from the adjacent areas, the image screen further being provided with a material emissive of invisible radiation when struck by an electron beam, said material being infrared emissive material which is absorptive of visible light and which is provided over substantially the entire area of the screen not occupied by the elemental phosphor areas, said material being located in the spaces between the elemental phosphor areas and adjacent each elemental phosphor area on at least part of the said additional portion of the screen struck by the same electron beam as that which strikes the said area, wherein the infra-red emissive material comprises particles of an infra-red phosphor pigmented with a visible-light absorbing material, the particles of the infra-red phosphor being substantially smaller in size than the particles of the elemental phosphor areas.

2. A color reproducing cathode-ray tube according to claim 1, wherein the mean particle size of the phosphors in the elemental phosphor areas is about 6 to 10 $\mu$m, and the mean particle size of the infra-red phosphor is about 1 to 2 $\mu$m.

3. A color reproducing cathode-ray tube according to claim 2, wherein the visible-light absorbing material comprises graphite particles having a mean size substantially less than 0.5 $\mu$m.

4. A color reproducing cathode-ray tube according to claim 2, wherein the image screen is stippled to a mean pit depth of from about 1.5 to 3 $\mu$m and a pit density of from about $1 \times 10^5$ to $15 \times 10^6$ pits/cm$^2$.

5. A color reproducing cathode-ray tube according to claim 2, wherein the first infra-red phosphor comprises cadmium sulphide with copper activator.

6. A color reproducing cathode-ray tube according to any one of claims 1 to 5, wherein the elemental phosphor areas are in the form of stripes extending fully across the image screen in one direction, and wherein the mask comprises a plurality of slits similarly extending fully across the screen in the same direction.

* * * * *